Figure 1:
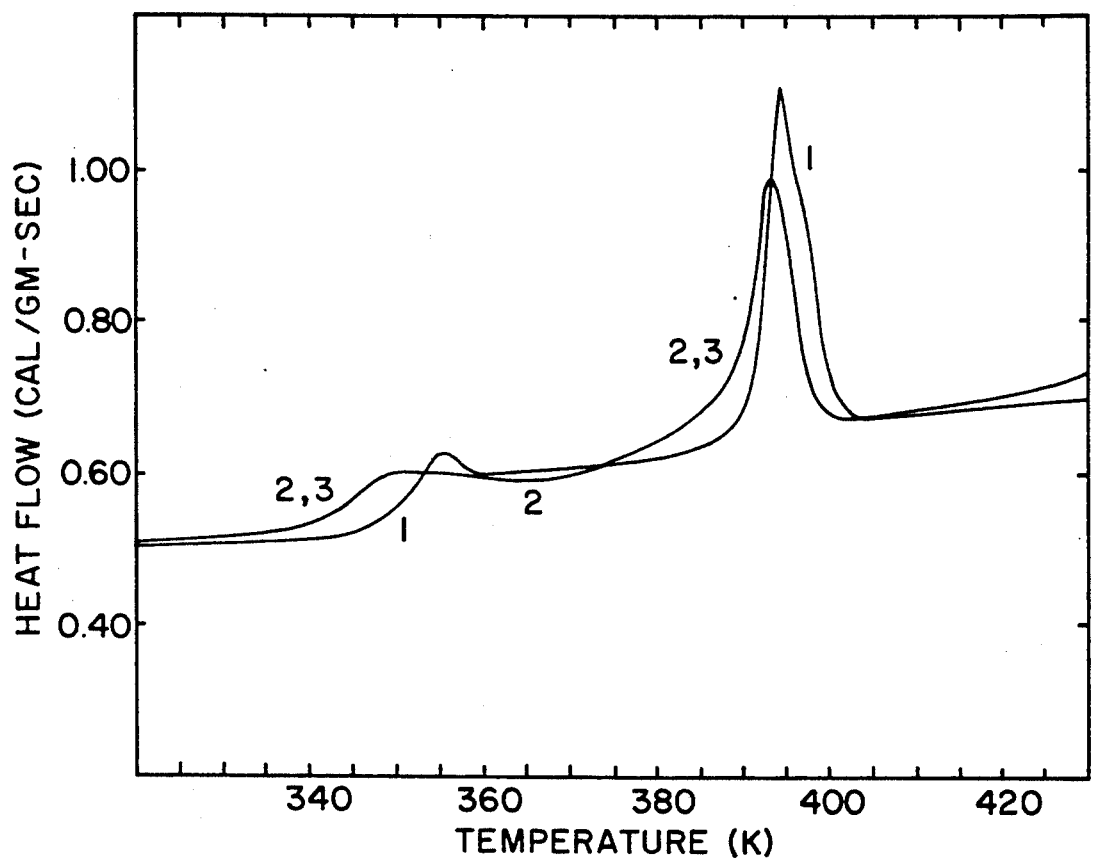

United States Patent [19]
Chung

[11] Patent Number: 5,157,068
[45] Date of Patent: Oct. 20, 1992

[54] SOLID SOLVENTS FOR IMPROVED PROCESSING OF VINYL CHLORIDE POLYMERS

[76] Inventor: Chan I. Chung, 23 Lillian La., Troy, N.Y. 12180

[21] Appl. No.: 701,829

[22] Filed: May 17, 1991

[51] Int. Cl.$^5$ ............................................... C08K 5/11
[52] U.S. Cl. ................................... 524/318; 524/315
[58] Field of Search ............................... 524/315, 318

[56] References Cited

U.S. PATENT DOCUMENTS

| | | | |
|---|---|---|---|
| 3,793,274 | 2/1974 | Hiyama et al. | 524/315 |
| 4,843,117 | 6/1989 | Chung | 524/568 |

OTHER PUBLICATIONS

"Dimer Acids", Kirk-Othmer, Encyclopedia of Chemical Technology, Third Ed., vol. 7, pp. 768-781, 1979, New York.
"Dicarboxylic Acids", pp. 614-617, ibid.
"Physical Properties of Straight Chain Alkenoic Acids", Kirk-Othmer, Encyc. of Chem. Tech., vol. 4, pp. 859-860 (not dated).
"Dimer Acids" Organic Polymer Chemistry by Saunders, pp. 189-190, 1973.
"Organic Polymer Chemistry", Fatty polyamides, pp. 189-190, K. J. Saunders, Chapman and Hall, London, 1973.
"Composition of Foods", Table 3–Selected fatty acids in foods, U.S. Department of Agriculture Handbook.

Primary Examiner—Paul R. Michl
Assistant Examiner—Tae H. Yoon
Attorney, Agent, or Firm—William J. Daniel

[57] ABSTRACT

The processibility during fabrication of a vinyl chloride polymer is improved by reducing the melt viscosity of the polymer when heated for shaping, by the admixture therewith of a small amount up to about 5% by wt of at least one melt-compatible normally crystalline solid solvent as a processing aid. At temperatures below the melting point of the solid solvent and the glass transition temperature of the polymer, the solid solvent deposits within the solid polymer as microdispersed solid microparticles which do not significantly adversely affect the mechanical properties of the solid polymer, whereas upon heating above the melt temperature of the mixture, the molten solid solvent is compatible with the molten polymer thereby effectively reducing its melt temperatures and melt viscosity during processing. Solid solvents found suitabe for vinyl chloride polymers are saturated carboxylic acids and their low molecular weight derivatives which have a crystalline melting point of at least about 80° C., preferably about 100° C., but not higher than about 180° C. and do not exert substantial permanent solvent effect on PVC. The solid solvent can be mixed directly with the polymer or via a carrier polymer containing the same.

10 Claims, 2 Drawing Sheets

SOLID SOLVENTS FOR IMPROVED PROCESSING OF VINYL CHLORIDE POLYMERS

BACKGROUND OF THE INVENTION

Polyvinyl chloride (PVC), by virtue of a particularly desirable combination of properties, including non-flammability, high chemical resistance, high strength and good weather resistance is one of the largest volume polymers, and it is probably the most versatile in the scope of its utility. PVC is essentially a glassy or amorphous polymer with a high glass transition temperature ($T_g$) of about 80° C., and thus alone it is rigid and brittle at use temperatures up to about 80° C., and particularly at the usual ambient temperatures. However, PVC can be made flexible and soft by adding a plasticizer typical of which is dioctyl phthalate (DOP). DOP, as with most plasticizers, and especially carboxylic acid esters, is a liquid at room temperature and acts as a weak solvent for PVC. The thus plasticized and flexible PVC, to be called SPVC, is used for vinyl seat covers, artificial leather, clothing items, etc. But for certain important purposes, PVC must be used without plasticizers. For instance, unplasticized rigid PVC, to be called RPVC, is used for vinyl siding, drainage and sewer pipe, water and electrical conduits and fittings, outdoor furniture, etc.

PVC is indeed an extremely versatile polymer and serves as an major industrial and consumer material for modern man. However, as is well known PVC presents serious difficulties in processing during fabrication, shaping, etc., and RPVC is peculiarly difficult to process. For manipulation during fabrication, RPVC because of a very high melt viscosity must be heated to at least about 210° C. to achieve complete fusion as is needed to impart optimum properties to the final product especially when produced by extrusion or injection molding. Unfortunately, PVC is thermally very unstable at about 210° C. and even considerably lower temperatures. Sarvetnick in "Polyvinyl Chloride", Van Nostrand Co., 1969, Page 90, states that the thermal degradation of PVC begins at about 93.3° C. and increases sharply with increasing temperature. At practical processing temperature, it quickly undergoes degradation, giving off very toxic and corrosive hydrochloric acid (HCl) fumes with serious loss in mechanical properties. Excessive scrap due to degradation, low production rates and poor product properties are notorious problems encountered in PVC processing.

As one way of improving the thermal stability as well as other properties of PVC, copolymers containing a major fraction of vinyl chloride units and a minor fraction of other monomeric units, such as vinyl acetate, serving to soften and flexibilize the ultimate polymer and reduce its glass transition or brittle temperature, have been developed and are widely used. Also, many processing aids, e.g. stabilizers, lubricants, impact modifiers, and the like also have been developed for PVC in order to facilitate processing at lower temperatures or to reduce the tendency of the polymer to undergo heat decomposition or impart more favorable properties. These aids must often be used in large amounts, up to 30-40% by wt of the polymer in the case of impact modifiers, and while these levels are tolerable or even desirable for SPVC, they are not acceptable for RPVC because they usually result in losses in essential properties.

The objective of this invention is to provide an improved processing aid and methods of utilizing such aids for vinyl chloride polymers which enable the same to be processed at lower temperatures without major adverse side effects. Selective low molecular weight crystalline chemical compounds have been found to behave as solid solvents to PVC when they are mixed therewith, qualifying as effective processing aids for PVC. A solid solvent is different in function from any of a plasticizer, lubricant or impact modifier. Thus, a solid solvent in homogenous admixture with PVC acts as solvent for the PVC, with the capacity for greatly reducing the melt viscosity of the PVC, only when the admixture is at high temperatures where the mixture is fused during processing. But when the mixture is cooled to room temperatures below the melting point ($T_m$) of the solid solvent and the $T_g$ of the polymer, the former precipitates out of the polymer as microdispersed solid micro-particles. Therefore, if the amount of solid solvent is controlled within proper limits, its presence does not adversely reduce the strength, rigidity or useful temperature range of solid PVC, especially RPVC. A solid solvent must possess thermally reversible compatibility or solubility with PVC. A plasticizer, on the other hand dissolves permanently into PVC, while a lubricant is a mechanically entrained friction-reducing additive that is basically incompatible with the polymer and does not act as solvent to it. Both therefore tend to impair desirable mechanical properties of the polymer in contrast to a solid solvent.

In a paper "A Solid Solvent as Processing Aid for Polystyrene," J. Applied Polymer Research, Vol. 37, 1339–1349 (1989), Chung et al. describe their investigation for an effective solid solvent for polystyrene (PS) which resulted in the identification of benzenesulfonamide (BSA) as an apparently ideal material for that purpose. BSA was found when incorporated at the 5% by wt level to reduce the melt viscosity of a sample of a typical commercial PS with normal molecular weight (Number average=87,000; Weight average=230,000; $T_g$=379° K.) by about 60%, i.e. from about 5,000 Pa-s for PS alone to about 2,000 Pa-s when BSA was present when tested at 490° K. at a low shear rate of about 4/S. A heat capacity measurement of powdered BSA in association with a finely divided low molecular weight PS fraction (MW=10,000; $T_g$=367° K.) was carried out in a differential scanning calorimeter (DSC) wherein transitions at either of the melting or glass transition points appear as deflections, e.g. peaks or shoulder-like increases in slope of the heat curve output of the DSC. Upon reheating of the DSC after once undergoing homogeneous melt mixing with the PS fraction and subsequent quenching, i.e. rapid cooling, the BSA caused roughly a 10° C. downshifting or drop in the $T_g$ of the PS fraction while retaining intact to a major degree the area of its own melting peak at its distinctive crystalline melting point as was developed during the initial melt mixing. The latter behavior signifies the presence of BSA in the quenched mixture as a distinct crystalline dispersed phase. In contrast for comparison, the same amount of mineral oil, which acts as a plasticizer for PS, while imparting during DSC analysis an even greater reduction in the $T_g$ of the low molecular wt. PS, i.e. of about 20° C., was able to reduce the viscosity of the high molecular wt. PS sample under the same viscosity test conditions only about half as much, i.e., from about 5,000 Pa-s to about 3,500 Pa-s. Mineral oil, being liquid over the test temperature range, of course showed no melting peak by DSC analysis, either during initial melt mixing or subsequent re-heating.

Also as a comparison, acetanilide (AA), with a crystalline $T_m$ of 115° C. only a little higher than the $T_g$ of PS, which had earlier being thought as a promising solid solvent candidate for PS, as reported by Chung in J. Applied Polymer Sciences, 31, 2739 (1986), was found inferior to BSA but superior to mineral oil in reducing melt viscosity of the same high molecular weight sample of PS to about 3,000 Pa-s. Upon DSC analysis with the low molecular PS sample, AA while achieving the greatest downshift of the three additives in the $T_g$ of that sample of at least 30° C., suffered during re-heating a major but not complete loss in the area of its melting peak, denoting substantial lasting solubility in the polymer after quenching of the latter to its solid state. AA by DSC testing alone was found to exhibit a wide hysteresis effect in its heat flow curves upon melting and subsequent rapid cooling alone in the absence of annealing, which effect was much greater than that of BSA when similarly treated. This hysteresis effect depressed the apparent recrystallization temperature ($T_c$) of AA below the $T_g$ of the PS sample, suggesting that recrystallizing ability of AA within the solidified PS was being hindered by its low apparent $T_c$.

Some 30 additional low molecular weight crystalline compounds, all with $T_m$ significantly higher than the $T_g$ of PS, that were evaluated by DSC during this study, and of these, only four were found to have promise as solid solvent for PS, including two carboxylic acid amide plus sebacic acid and mannitol. As noted, all DSC tests were conducted using the low MW fraction of PS having a $T_g$ significantly lower (by 12° C.) than that of the commercial PS sample. This difference in $T_g$ due to the difference in MW of PS would be expected from the phase diagram of that polymer reported in "Plasticization and Plasticizer Processes," a symposium report No. 48 of The Advances in Chemistry Series, American Chemical Society, Washington, D.C., 1965, Page 39. In as much as low MW grades of PS are themselves known to function as internal plasticizers for normal high MW general purpose grades of PS, acting to improve the flow rate while increasing the brittleness thereof (Cf. "Polymer Technology" by Miles and Briston, Chemical Publishing Co., Inc., New York, 1965, Page 188), the effectiveness of any of these other compounds in actually reducing the melt viscosity of PS in the normal MW range, is speculative at best. In particular, extrapolation as to such effectiveness between chemically very different materials within the usual practical MW range based on DSC data is obviously out of the question.

The solid solvent concept was applied by Chung in U.S. Pat. No. 4,843,117 to vinylidene chloride-containing polymers. e.g., copolymers of vinylidene chloride and a minor amount of vinyl chloride or methyl acetate. Dimethyl sulfone at a concentration of 5% was found to be an effective solid solvent for such polymers, reducing melt viscosity e.g. by almost 40%, i.e, from about 10,000 Poise to about 6,000 Poise, at a low shear rate of 100/sec and 175° C.

While PS can under special polymerizing conditions with Ziegler catalysts be produced as an isotactic crystalline polymer with a high crystalline $T_m$ of about 230° C., (Cf, Miles and Briston, supra, Page 187), PS as ordinarily used is an amorphous polymer, like PVC, with a high $T_g$ of about 100° C. Its intrinsic brittleness can be readily modified for improved toughness. But unlike PVC, it is quite fluid, e.g., suitable for good injection molding, at 217° C. (490° K.) as used by Chung et al. PS is free of any tendency to suffer decomposition during processing.

Polyvinylidene chloride (PVDC) being highly crystalline with a true $T_m$ of 190° C. and a quite low $T_g$ of −19° C., while lacking the brittleness of PVC at ordinary use temperatures, is even more difficult to process in its pure form and more susceptible to heat degradation than PVC, and so in that form is of no commercial importance (Cf, "Manufacture of Plastics", by Smith, Reinhold publishing, New York, 1964, pp. 337-339). For commercial purposes, PVDC is always copolymerized with a modifying co-monomer, such as vinyl chloride, vinyl acetate, acrylonitrile, etc., and the resultant co-polymers have a reduced melt temperature. For example, Park in "Plastics Film Technology", Van Nostrand-Reinhold Co., 1969, Pages 35 & 36. describes a bubble process for forming a film of a PVDC-PVC copolymer (85/15) in which the copolymer is satisfactorily extruded at 170° C. Such film, which is sold commercially in large quantities under the trademark "SARAN", has excellent optical clarity and high tensile strength. Also, in the Example of the above-identified U.S. Pat. No. 4,843,117 to Chung, the PVDC copolymer had a melt temperature of about 175° C. At such temperatures, the decomposition problem of PVDC copolymers is serious.

There is a need in practice to develop processing aids for RPVC to address the unavoidable characteristics of use temperature rigidity and processing temperature decomposition of that polymer. The identification of workable solid solvents for RPVC is a more pressing problem than for either of PS or of PVDC copolymers because of the large volume of PVC in use.

I have now discovered that low molecular weight crystalline carboxylic acids and their simple derivatives which have a crystalline melting point at least equal to the $T_g$ of about 80° C. for PVC, and preferably higher, but not higher than about 180° C. are useful solid solvents for rigid PVC polymers consisting essentially of vinyl chloride. This is surprising since, in the first place, amorphous polymers, as is PVC, have a strong tendency towards permanent solvation with compounds which exert a plasticizing action thereon. As stated in the ACS symposium report "Advances in Chemistry Series", No. 48, supra, at Page 3: "With an amorphous polymer, any plasticizer is a solvent plasticizer—i.e., under suitable conditions the polymers would eventually dissolve in the plasticizer." This holds true for common closely related carboxylic acid esters and diesters which are liquids at room temperature and are among the most widely used solvent plasticizers for various polymers, notably PVC. In the second place, the compounds found advantageous for RPVC are chemically different from those found effective for PS and PVDC co-polymers, respectively, namely BSA and dimethyl sulfone, as described above, and the latter proved unsuitable as solid solvents for RPVC.

DESCRIPTION OF THE INVENTION

An effective solid solvent for PVC needs to satisfy several requirements. First, the additive compound should be a generally low molecular weight crystalline material having a crystalline melting point of at least about 80° C. up to about 180° C. and preferably at least about 100° C. If the $T_m$ of the additive is appreciably below 80° C., the PVC undergoes solidification first.

Since the PVC becomes rigid below its $T_g$ of about 80° C., the rigidity tends to interfere with the ready precipitation and growth of the additive into micro-dispersed micro-crystals, forcing the additive to remain in solid solution form. The additive needs to be free to undergo micro-dispersion in order to assume a benign condition with respect to the mechanical properties of the solid polymer and those properties suffer if the polymer is the first to solidify. On the other hand, if the $T_m$ of the additive is much above 180° C., the mixture must be heated to so high a temperature to become completely fused for processing that the danger of decomposition of the polymer is increased.

By utilizing an additive having the preferred minimum $T_m$ of at least about 100° C., one can minimize the possibility of encountering a hysteresis effect during quenching and re-heating of the mixture resulting in an apparent $T_c$ of the additive below the polymer solidification temperature notwithstanding a higher rated $T_m$. In this way, solidification of the additive prior to polymer solidification is virtually ensured. It is noted that $T_c$ is always lower than $T_m$.

Also, a significant difference between the $T_g$ range of the polymer and the $T_m$ of the additive is advantageous for accurate DSC evaluation since if these values overlap, discrimination in the behavior of the polymer and additive during DSC testing is less clear and evaluation more difficult.

With regard to the molecular weight of the additive, the upper limit is not particularly critical and generally the molecular weight can range up to several hundred, say about 400-500 without difficulty.

The selected additive compound must exhibit thermally reversible compatibility or solubility in the polymer. This means that it is compatible/soluble in the polymer when both are in molten condition but is substantially incompatible/insoluble in the polymer when both are in solid condition. In the latter case, the additive is present as micro-crystals homogeneously dispersed within a matrix of the solid polymer. These micro-crystals are held in uniform suspension within the polymer as they are formed during cooling because they are prevented from settling out by the high melt viscosity of the polymer until the polymer itself solidifies.

The requisite differential solubility behavior of the additive vis-a-vis the polymer can be identified in various ways. The visual appearance of the mixture is a gross but generally reliable indicator. If the additive is compatible with the polymer when both are molten, the fused mixture will be at least essentially optically clear or water-white. Conversely, incompatibility when in the solid state is denoted by a cloudy or translucent appearance. This observation naturally must be made in the absence of pigments, fillers, etc. which are often included in commercial PVC formulations and would be likely to inherently alter the appearance of the mixture. Theoretically, the additive could form as microcrystals of such fineness to be below the limits of optical visibility and in that event, it could be present as an invisible micro-dispersed phase. But, this would be a rare occurrence and as a general rule visual inspection is a reliable test.

Alternatively, and perhaps more reliably, one can resort to heat capacity measurement using a DSC as described previously. In this procedure, the additive and polymer must first be homogeneously blended and melted together—a mixture of solid particles of additive and polymer separately will always upon initial melting in a DSC reflect as deflections in the heat flow curve the separate melting/transition points of each of the components. After the initial melting followed by cooling to solidify the mixture, re-melting in the DSC will indicate whether the additive is present as a solution, i.e. in solvated form, or as a dispersed phase within the solid polymer. In the former case, only the melting point/range of the polymer will upon re-melting appear as a deflection in the scanning curve of the DSC; the original melting peak at the $T_m$ of the additive at least essentially disappears upon re-melting. In the latter case, a peak-like deflection will appear in the vicinity of the $T_m$ of the additive, reflecting the effect of the heat of fusion thereof. It follows that the area under the melting peak for the additive during the second melting compared to the area of the peak for the additive during the initial melt mixings is an indication generally of the degree of incompatibility of the additive and the polymer under solid state conditions. For 100% incompatibility, the melting peak area of the additive will approximate the area under the peak shown by the additive during the original melt mixing of the mixture of separate particles, while for 100% compatibility, the additive peak upon re-melting disappears. Complete or 100% incompatibility is not desirable but the additive should retain at least about 20-25% of its original peak area, and preferably at least about 50% and most preferably 75-80%, to avoid an undesirable plasticizing/solubilizing effect of the additive upon the solid polymer, which adversely influences the solid state properties of the polymer-additive blend.

DSC evaluation preferably includes duplicating the re-melting following different cooling conditions, i.e. re-melting after rapid cooling or quenching as well as after gradual cooling to ensure an accurate observation by allowing for any differences in the rate of crystallization at substantially different cooling rates, as usually occur.

Next, as a measure of the melt compatibility of the polymer and the additive, the presence of the additive during DSC scanning should upon re-melting cause a small downward displacement or drop in the glass transition temperature range of the polymer component of the mixture, that is, a change in the location of the $T_g$ deflection of the polymer in the DSC scanning curve from the original location of that range. To explain further, during the original melt mixing of the separate solid particles of polymer and additive, a deflection in the heat flow curve of the DSC appears at a temperature range corresponding approximately to the $T_g$ of the polymer. Then, during re-melting after cooling, the deflection range for the polymer should appear at a lower temperature differing from the original one by a small amount.

The extent of this drop is affected by the amount of the additive and the cooling rate but will usually be about 1°-2° C. up to about 10° C. and occasionally somewhat higher. This $T_g$ down-shifting effect indicates the degree of compatibility between the polymer and the additive, and thus the ultimate effectiveness of the additive in reducing the melt viscosity of the polymer.

Upon re-melting after rapid cooling or quenching, the drop in $T_g$ of the polymer will usually be greater than after slow cooling, say about 5° C. or higher. This indicates that the additive possessed a desirable compatibility with the polymer in the molten state and that this compatibility persisted when the blend was rapidly cooled and re-crystallization of the additive was consequently hindered. After slow cooling affording the additive the opportunity to undergo re-crystallization freely, the $T_g$ drop should preferably be toward the lower limit. This reflects only a small solvent action by the additive on the polymer in the solid state, maximizing the useful physical properties contributed by the polymer to the solid blend. Theoretically, a negligible drop in polymer $T_g$ would be ideal from the standpoint of solid state properties but this would be offset by a loss in melt compatibility. Hence, a balance between the two extremes should be the objective, achieving good melt compatibility needed to reduce melt viscosity without a serious loss in the physical properties of the solid blend for product purposes.

Because PVC is amorphous, its $T_g$ during DSC analysis is more likely to be manifested by significant upward change or shoulder in the slope of the scanning curve extending over a limited temperature range rather than as a true peak or vortex as generally holds for the crystalline additive.

The most important contribution of the additive is a significant reduction in the melt viscosity of the polymer under actual melt flow conditions. For a practical evaluation of this effect, one should employ a continuous rheometer, such as a Haake or Brabender extruder-based rheometer because of the thermal instability of PVC. A reduction of at least about 20% in polymer melt viscosity is desirable for minimum effectiveness as a solid solvent and a greater reduction is better if possible.

By reducing the melt viscosity of PVC by the use of a solid solvent, processing of the polymer can take place at a significantly lower temperature with important benefits of less scrap, higher production rate, enhanced product properties and less energy consumption in processing. Even a relatively small reduction in processing temperature can be definitely advantageous. This is because the thermal degradation rate of PVC decreases exponentially with decreasing temperature and thus even a small reduction of the melt temperature during processing can significantly improve the thermal stability of PVC.

Finally, the additive must meet any obvious practical standards applicable to a particular contemplated use such as freedom from toxicity, carcinogenic action, adverse environmental consequences, etc.

The carboxylic acids and their low MW derivatives as solid solvent of the invention should be saturated; unsaturated compounds are susceptible to oxidation and can lead to degradation of polymers with which they are in association. Except for those having a long carbon chain, simple monocarboxylic acids below about capric acid (decanoic acid; $T_m=31°$ C.) are not suitable because they are not solid even at room temperature. For behenic acid (docosanoic acid; $T_m=80°$ C.) and above, a crystalline melting point above about 80° C. usually is present (e.g., tricosanoic acid, $T_m=79°-80°$ C.; octacosanoic acid, $T_m=92°-94°$ C.; etc. listed in Table 1). These higher monocarboxylic acids should be workable here. In particular, tricosanoic acid, hexacosanoic acid and octacosanoic acid show the desirable behavior by DSC analysis.

TABLE 1

Long-Chain Monocarboxylic Acids as Potential Solid Solvent for PVC

| Chemical | Structure | Melting Point °C. |
|---|---|---|
| Docosanoic Acid | $CH_3(CH_2)_{20}COOH$ | 80 |
| Tricosanoic Acid | $CH_3(CH_2)_{21}COOH$ | 79–80 |
| Tetracosanoic Acid | $CH_3(CH_2)_{22}COOH$ | 75–83 |
| Hexacosanoic Acid | $CH_3(CH_2)_{24}COOH$ | 87–89 |
| Octacosanoic Acid | $CH_3(CH_2)_{26}COOH$ | 92–94 |

Saturated dicarboxylic acids are as a group suitable in principle provided of course that the carbon chain is not so long that the $T_m$ falls outside the above-specified range of about 80°–180° C. These acids illustrated by those listed in Table 2 all have a crystalline structure below their $T_m$. For example, the lowest member, oxalic acid has $T_m$ of 101° C. in dihydrate form (although it is poisonous and better avoided unless suitable safeguards are available) while at least up to tetradecanedioic acid ($T_m=122°-125°$ C.), the $T_m$ is within the desired limits. For instance, adipic acid ($T_m=152°-154°$ C.), suberic acid ($T_m=142°-144°$ C.), azelaic acid ($T_m=109°-110°$ C.), sebacic acid ($T_m=135°-137°$ C.), dodecanedioic acid ($T_m=128°-130°$ C.), and tetradecanedioic acid ($T_m=126°-128°$ C.) are all useful at least to some degree although some may be better than others. Succinic acid ($T_m=185°$ C.) with a high melting point a little over 180° C. is an exception from the melting point pattern of this group and is generally at the upper threshold of usefulness as regards melting point. All of the above saturated dibasic acids possess the characteristics required as a solid solvent for PVC. In particular, sebacic acid, suberic acid, adipic acid, dodecanedioic acid and tetradecanedioic acid show the desirable behavior by DSC analysis. Azelaic acid retains a somewhat smaller proportion, say about 20-25%, of the area of its melting peak upon DSC re-melting for reasons not presently understood and may represent approximately the lower threshold of usefulness.

TABLE 2

Dicarboxylic Acids as Potential Solid Solvent for PVC

| Chemical | Structure | Melting Point °C. |
|---|---|---|
| Oxalic acid dihydrate | $(COOH)_2 \cdot 2H_2O$ | 101 |
| Malonic acid | $CH_2(COOH)_2$ | 136 |
| Succinic acid | $(CH_2)_2(COOH)_2$ | 184 |
| Glutaric acid | $(CH_2)_3(COOH)_2$ | 98 |
| Adipic acid | $(CH_2)_4(COOH)_2$ | 152–154 |
| Pimelic acid | $(CH_2)_5(COOH)_2$ | 106 |
| Suberic acid | $(CH_2)_6(COOH)_2$ | 142–144 |
| Azelaic acid | $(CH_2)_7(COOH)_2$ | 109–110 |
| Sebacic acid | $(CH_2)_8(COOH)_2$ | 135–137 |
| Hendecanedioic acid | $(CH_2)_9(COOH)_2$ | 111 |
| Dodecanedioic acid | $(CH_2)_{10}(COOH)_2$ | 128–130 |
| Brassylic acid | $(CH_2)_{11}(COOH)_2$ | 114 |
| Tetradecanedoic acid | $(CH_2)_{12}(COOH)_2$ | 126–128 |

In addition to the acids themselves, their simple derivative should also prove useful where they otherwise satisfy the criteria imposed above. This includes the amides, imides, anhydrides, aldehydes, hydroxyl substituted, lower alkyl-substituted, say up to about $C_{4-5}$ and the like. The amides of monocarboxylic acids have somewhat higher $T_m$ than the free acids themselves and hence may qualify when the free acids do not. The cyclic imides of the dicarboxylic acids should be suitable; succinimide ($T_m=124°$ C.), for example, retains a rather weak peak upon re-melting by DSC and is also at or near the lower threshold of usefulness. As a rule, the $T_m$ of dibasic acid diamides exceed the stated limits and are excluded as illustrated by succinic acid diamide ($T_m=268°$ C.) and adipic acid diamide (adipamide, $T_m=226°$ C.). However, the monoamides may have the necessary lower $T_m$ such as adipic acid monoamide ($T_m=161°$ C.) and succinamic acid ($T_m=153-156°$ C.). Cyclic anhydrides of the dibasic acids can fit within the parameters such as succinic anhydride ($T_m=119°$ C.) but the monobasic anhydrides tend to be low in $T_m$ such as stearic anhydride ($T_m=72°$ C.) and palmitic acid anhydride ($T_m=64°$ C.). Succinic aldehyde occurs in several different isomeric forms of which at least one has a $T_m$ within the present range, e.g. the delta isomer ($T_m=135°$ C.). Adipaldehyde, on the other hand, is normally liquid and thus unsuitable. Examples of substituted acids include DL-12 hydroxystearic acid ($T_m=81°-82°$ C.) and 2,2'-dimethylsuccinic acid ($T_m=142°$ C.). The latter has a considerably reduced re-melting peak indicating substantial permanent solvation in PVC and is among the least preferred compounds. Other analogous and homologous substituted derivatives having the necessary combination of properties could certainly be substituted. A variation in the structure of the dibasic acids is represented by ketopimelic acid of the formula $CO(CH_2CH_2COOH)_2$ with $T_m=143°$ C., which shows strong melting peak retention with only a minimum melting peak drop of a little less than 5° C. Another variation is thiodiglycolic acid of the formula $S(CH_2COOH)_2$ with $T_m=128°-131°$ C., which also shows the desirable behavior in DSC analysis.

For purposes of test evaluation to determine the existence of the fundamental qualifying properties, the solid solvent candidate should be combined with PVC in the absence of other constituents. After suitability has been established, however, the solid solvent can be added via other ingredients that may be present in a working formulation, such as a carrier polymer or other additive. While the invention is concerned especially with PVC homopolymers, the PVC can be co-polymerized with a minor amount of a co-monomer imparting some advantageous modification in polymer properties. Up to, say about 15% by wt. of the total monomer content can be supplied by the co-monomer and the phrase "consisting essentially of PVC" as used herein is intended to cover such co-polymers. An illustrative co-monomer is vinyl acetate.

EXAMPLES

Figure 2:
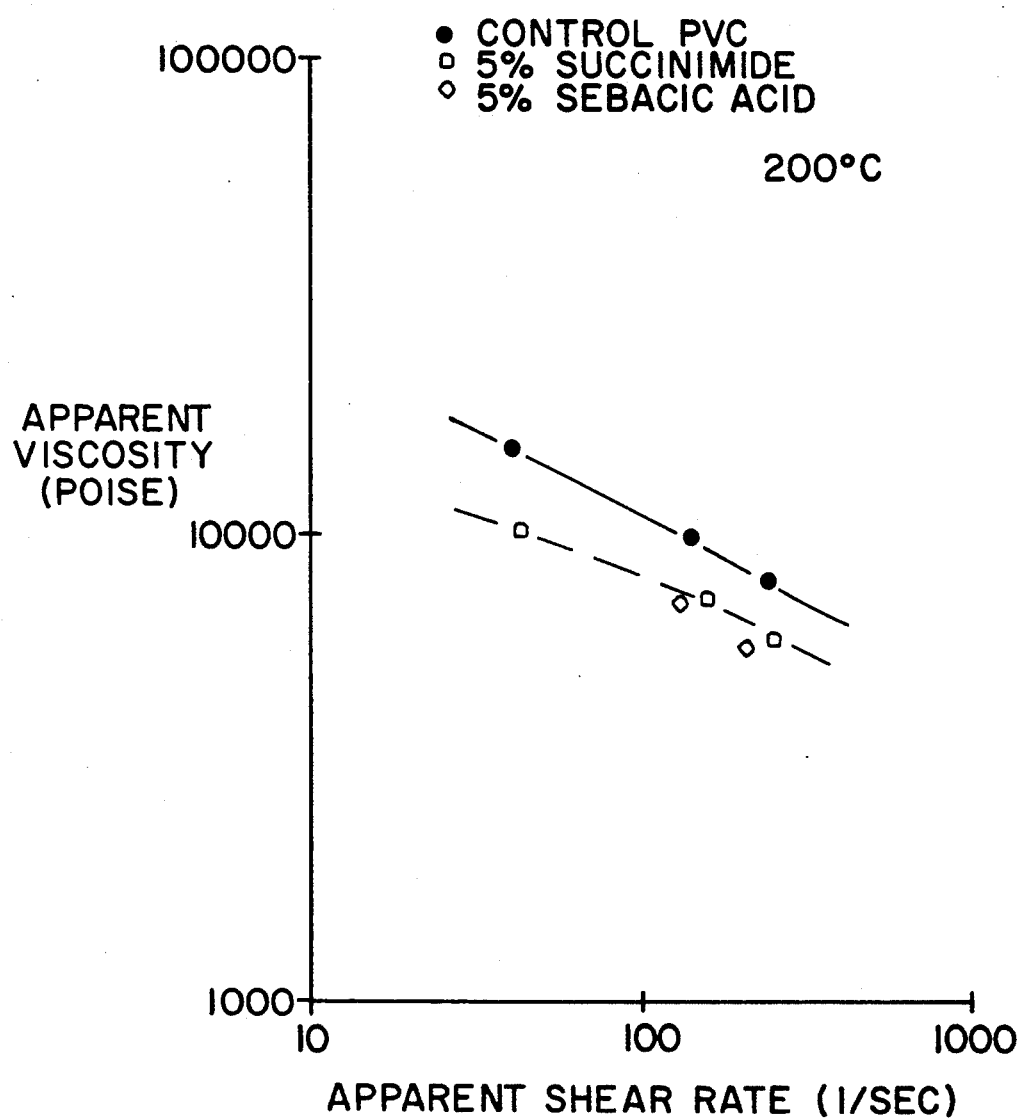

One crystalline chemical selected as a solid solvent for PVC was sebacic acid with the chemical structure, $HOOC(CH_2)_8COOH$, and $T_m$ at about 135° C. Five percent (by weight) sebacic acid powder was mixed with unplasticized PVC powder used as RPVC, and the mixture was tested on a Perkin-Elmer DSC obtaining the DSC heat flow curves presented in FIG. 1. Curve obtained during the initial heating, i.e. melt mixing, of the mixture of separate powders at a heating rate of 20° C./min, shows the midpoint ($T_g$) of the glass transition range of the PVC powder around 77° C. (350° K.) and the measured melting peak ($T_m$) of sebacic acid at about 122° C. (395° K.). At the end of the initial heating, the mixture was rapidly cooled or quenched in the DSC at about 320° C./min and then re-heated. Curve 2 was obtained during the second heating of the mixture at a rate of 20° C./min. Curve 2 shows a drop in the $T_g$ of the PVC powder to about 72° C. (345° K.) and the melting peak of sebacic acid dropped slightly to about 120.5° C. The area under the re-melting peak of sebacic acid of Curve 2 is slightly less than that of the original peak of Curve 1, indicating that a small amount of sebacic acid was permanently dissolved in the PVC powder. The glass transition of the PVC powder was shifted to a lower temperature by about 5° C., due apparently to the plasticizing effect of the dissolved sebacic acid. The melting peak of sebacic acid also was shifted on re-melting to a slightly lower temperature due to the interaction between sebacic acid and PVC. At the end of the second heating, the mixture was gradually cooled at the rate of 20° C./min and Curve 3 was obtained during the third heating of the mixture at 20° C./min. Curve 3 is identical to Curve 2. The DSC results revealed that sebacic acid, after being mixed and melted with the PVC powder, recrystallized upon cooling leaving only a small amount dissolved in PVC, and that the small amount of sebacic acid dissolved in PVC effectively solvated PVC reducing its glass transition point. Thus, sebacic acid clearly showed the desired solid solvent behavior for PVC in the evaluation. To confirm that the ability of an additive to effectively reduce the $T_g$ of PVC could be taken as an indication for the ability of the additive to effectively reduce the melt viscosity of PVC, the solubility/compatibility of sebacic acid in PVC at melt temperatures was studied by measuring the melt viscosity of PVC using a Haake continuous rheometer. FIG. 2 presents the results of the viscosity measurements at 200° C., which show that the viscosity of the PVC sample was reduced by as much as 30% by the addition of 5% sebacic acid, clearly establishing that sebacic acid acted as a solvent to PVC at 200° C. Thus, sebacic acid was found to be a good solid solvent for PVC. Succinimide shown in FIG. 2 also was found to be a good solid solvent for PVC.

Various other compounds were tested by DSC analysis and were found to possess generally the desired characteristics for this invention. These compounds and the test results are summarized in Table 3. The data in Table 3 were read during re-melting after gradual or slow cooling.

TABLE 3
Results of DSC Evaluation

| | $T_m$, °C.*[1] | Drop in PVC $T_g$, °C. | Re-Melting Peak Retention |
|---|---|---|---|
| Tricosanoic acid | 81 | —*[2] | very strong |
| Hexacosanoic acid | 90 | —*[2] | very strong |
| Octacosanoic acid | 94 | —*[2] | very strong |
| Adipic acid | 152 | 4 | very strong |
| Suberic acid | 146 | 6 | very strong |
| Azelaic acid | 109 | 11 | weak |
| Sebacic acid | 122 | 5 | very strong |
| Dodecanedioic acid | 126 | 5 | very strong |
| Tetradecanedioic acid | 134 | 5 | very strong |
| Ketopimelic acid | 143 | 4 | very strong |
| Thiodiglicolic acid | 130 | 4 | moderate |
| DL-12 Hydroxystearic acid | 82 | —*[2] | moderate |
| 2,2'-Dimethyl succinic acid | 145 | 11 | weak |
| Succinimide | 119 | 18 | weak |
| Octadecanamide | 107 | 6 | weak |

*[1]As actually measured during the initial heating
*[2]Unable to detect due to $T_g$ and $T_m$ overlapping The amount of the solid solvent can be adjusted within fairly broad limits depending upon the applicable circumstances, from a fraction of 1%, say about 0.3%, up to 10% or so based on the weight of the polymer present. For a solid solvent having a strong down-shifting effect on the $T_g$ of the polymer, lower amounts might be sufficient.

The concept of this invention was developed especially for use with unplasticized PVC polymers to make RPVC products but it could also be useful for plasticized PVC polymers in special situations to permit a reduction in the amount of plasticizer or other additives and better control over the ultimate properties of the polymer formulation.

Variations other than those described above could of course be devised by those skilled in the use of additives in polymer chemistry and are intended to be within the scope of this invention.

I claim:

1. A method of improving the melt processability of a polymer consisting of essentially of polyvinyl chloride, which method comprises the step of incorporating in the polymer to be subjected to melt processing as a solid solvent therefor an effective amount of a saturated aliphatic mono-carboxylic acid, or a saturated aliphatic dicarboxylic acid having a total of not more than about 14 carbon atoms, or a simple derivative thereof, said acid or said derivative possessing the following properties:
   1) a molecular weight not higher than about 500
   2) a crystalline structure when solid
   3) a crystalline melting point $T_m$ in the range of about 80°–180° C.
   4) a significant retention of its melting peak area upon re-melting by differential scanning calorimeter (DSC) analysis compared to its original melting peak when melted as a powdered mixture with said polymer,
   5) a small reduction upon re-melting of up to about 10° C. in the glass transition ($T_g$) range of said PVC determined by DSC analysis from the original glass transition range of said PVC, and
   6) solubility in said PVC when both are in molten condition,
the amount of the incorporated solid solvent being sufficient to reduce significantly the melt viscosity of said PVC from the melt viscosity of said PVC alone.

2. The method of claim 1 wherein said derivative is an amide, imide, anhydride, aldehyde, or ketone of said acid or is an hydroxy- or lower alkyl substituted acid.

3. The method of claim 1 wherein said solid solvent is present in an amount equal to about 0.3% to about 10% by wt. of the polymer.

4. The method of claim 1 wherein said polymer is essentially free of plasticizer and is adapted for processing into products which are generally rigid at use temperature.

5. The method of claim 1 wherein the small reduction in the $T_g$ of said polymer was measured upon re-melting following gradual cooling of the mixture after melting.

6. A composition comprising an admixture of a polymer consisting essentially of polyvinyl chloride and as a solid solvent therefor a saturated aliphatic mono-carboxylic acid, or a saturated aliphatic dicarboxylic acid having a total of not more than about 14 carbon atoms, or a simple derivation thereof, said acid or said derivative possessing the following properties:
   1) a molecular weight not higher than about 500
   2) a crystalline structure when solid
   3) a crystalline melting point $T_m$ in the range of about 80°–180° C.
   4) a significant retention of its melting peak area upon re-melting by differential scanning calorimeter (DSC) analysis compared to its original melting peak when melted as a powdered mixture with said polymer,
   5) a small reduction upon re-melting of up to about 10° C. in the glass transition range of said PVC determined by DSC analysis from the original glass transition range of said PVC, and
   6) solubility in said PVC when both are in molten condition,
the amount of said solid solvent being effective to significantly reduce the melt viscosity of said admixture from the melt viscosity of the polymer alone.

7. The composition of claim 6 wherein said derivative is an amide, imide, anhydride, aldehyde, or ketone of said acid or is an hydroxy- or lower alkyl substituted acid.

8. The composition of claim 6 wherein said solid solvent is present in an amount equal to about 0.3% to about 10% by wt. of the polymer.

9. The composition of claim 6 wherein said polymer is essentially free of plasticizer and is adapted for processing into products which are generally rigid at use temperature.

10. The composition of claim 6 wherein the small reduction in the $T_g$ range of the polymer was measured upon re-melting following gradual cooling of the mixture after melting.

* * * * *